Sept. 21, 1937.   A. E. McCOY   2,093,920
POTATO HARVESTER
Filed Jan. 16, 1937   3 Sheets-Sheet 1
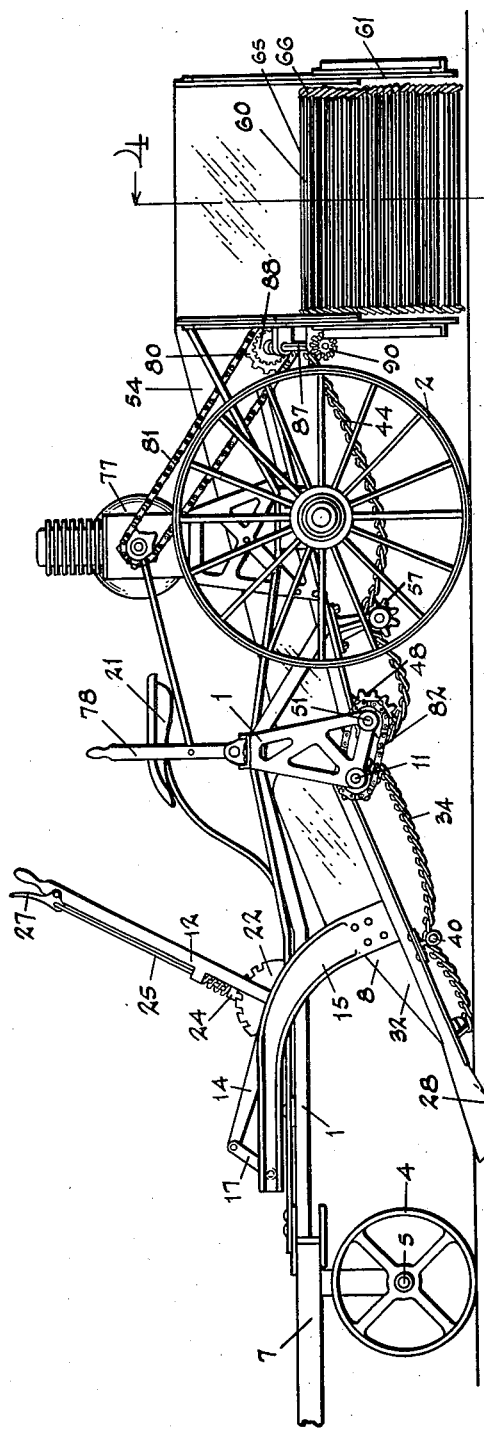
Inventor
Aaron E. McCoy
By [signature]
Attorney Sept. 21, 1937.　　　A. E. McCOY　　　2,093,920
POTATO HARVESTER
Filed Jan. 16, 1937　　　3 Sheets-Sheet 2

Inventor
Aaron E. McCoy
By [signature]
Attorney

Sept. 21, 1937.   A. E. McCOY   2,093,920
POTATO HARVESTER
Filed Jan. 16, 1937   3 Sheets-Sheet 3

Inventor
Aaron E. McCoy
Attorney

Patented Sept. 21, 1937

2,093,920

UNITED STATES PATENT OFFICE 2,093,920

POTATO HARVESTER

Aaron E. McCoy, Malin, Oreg.

Application January 16, 1937, Serial No. 120,963

6 Claims. (Cl. 55—51)

My invention relates to a machine for harvesting products of vegetation that grow contiguous to the soil surface, such as tubers and bulbs of different forms. The machine particularly provides means for gathering tubers or bulbs and the like and immediately separating them from the soil that may cling thereto or of necessity, be gathered therewith as the machine progresses over the planted areas.

The invention provides a reticular or latticed member through which the gathered soil may pass to the ground. It particularly provides a belt formed of parallel rods spaced to convey the gathered products of vegetation and allow subdivided portions of the soil to pass therethrough to the ground as the vegetables are raised from the surface of the ground. It also provides means for laterally moving the harvested products as they are raised which produces interrubbing contact of the vegetables and removal of such portions of the soil that may adhere to their surfaces.

The invention also relates to a means for preventing the vegetables from which the major part of the soil has been separated from rolling backward to the ground.

The invention consists in other features which will appear from the following description and upon examination of the drawings forming a part hereof. Structures containing the invention may partake of different forms and may be varied in their details and still embody the invention. I have selected a potato harvester as an example of the various structures that contain the invention and shall describe the selected structure hereinafter, it being understood that certain features of my invention may be used without a corresponding use of other features of the invention and without departing from the spirit of the invention as presented hereinafter. The particular structure selected is shown in the accompanying drawings.

Figure 3:
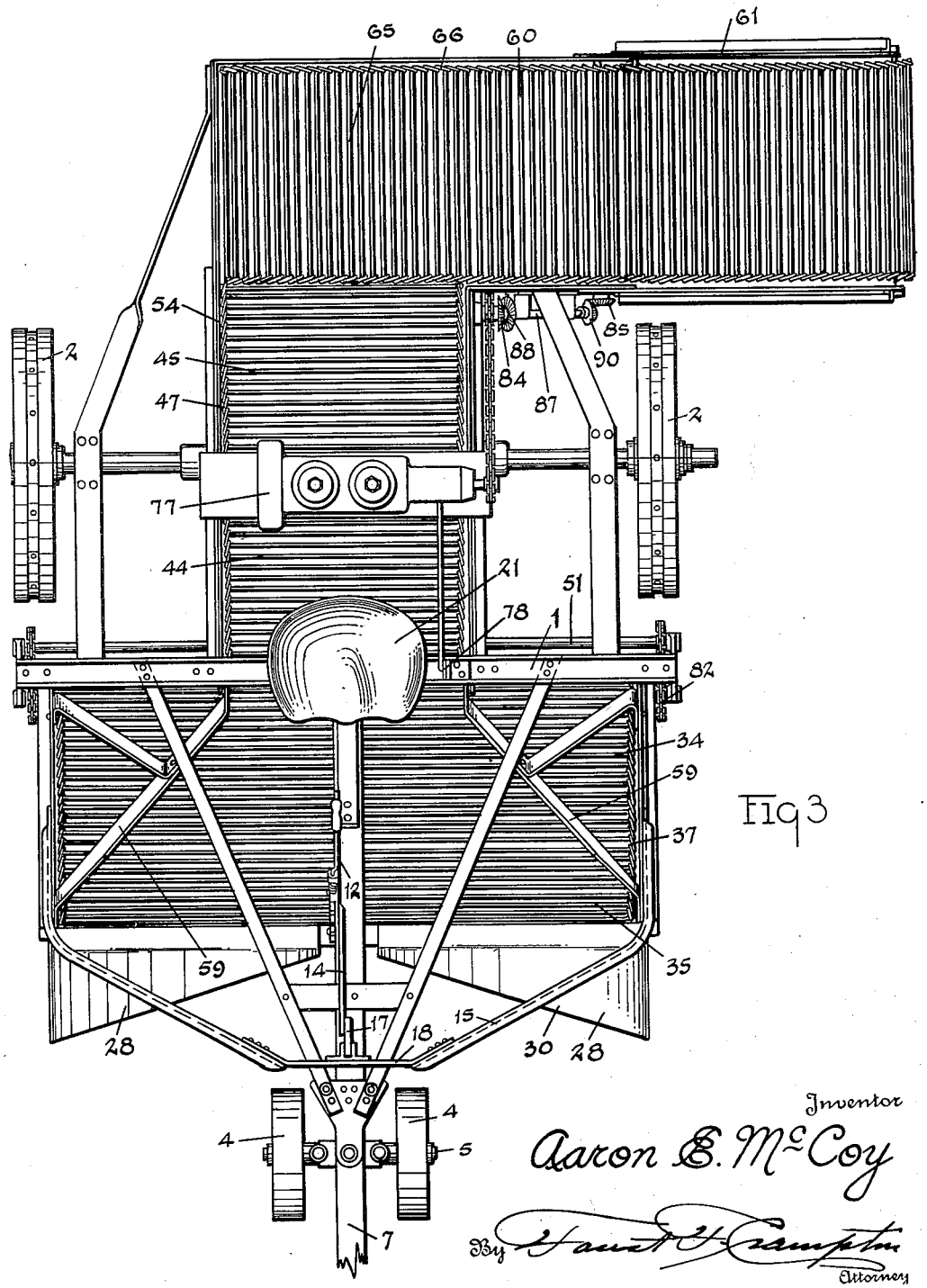
Figure 4:
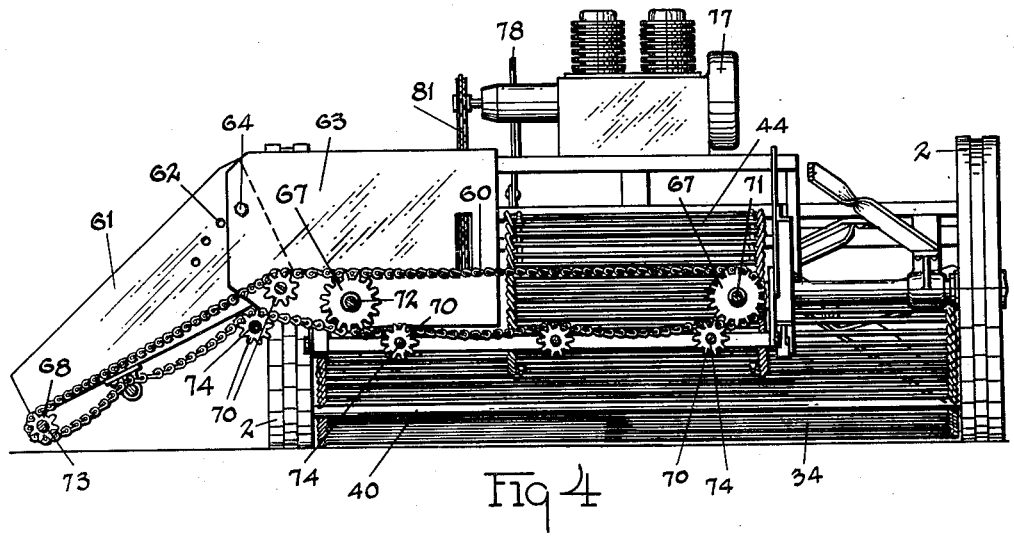
Figure 5:
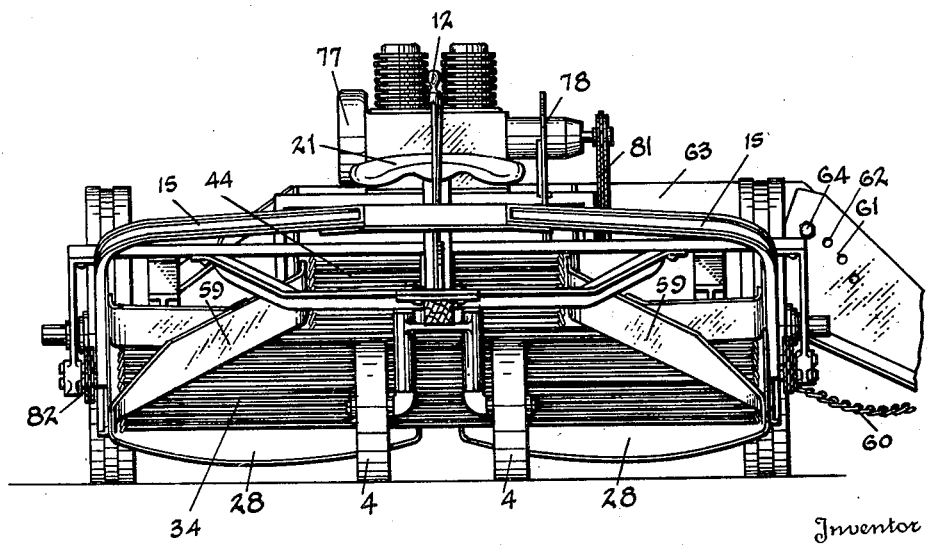

Fig. 1 illustrates a side view of the machine. Fig. 2 illustrates a longitudinal central vertical section of the machine. Fig. 3 illustrates a top view of the machine. Fig. 4 illustrates a view of a transverse section of the machine taken on the line 4—4 indicated in Fig. 1. Fig. 5 illustrates a front view of the machine.

The machine shown in the drawings has a frame 1 formed of interconnected parts of a character well known in the construction of such machines. The machine is provided with the rear wheels 2 and the forward guiding wheels 4 connected to the swiveled axle 5. The axle 5 may be connected to a tongue 7 for guiding the machine. The machine may be drawn by a tractor or may be self-propelled and guided by a suitable steering wheel in the manner well known in connection with agricultural implements generally.

The machine is provided with a gathering means for gathering vegetables that grow in proximity to the soil surface, such as potatoes, tubers, and the like, and for separating them from the soil that may be unavoidably gathered therewith. In the particular machine shown in the drawings, provision is made for gathering potatoes from a plurality of rows. The gathering means of the machine extends across two rows of vegetation to be harvested. The machine has a pair of connected troughs 8 hingedly supported on a shaft 11 that is rotatably supported at its ends in bearings located in parts of the frame 1 of the machine. The other end of the trough 8 may be adjustably disposed with reference to the level of the ground by means of a lever 12 having an arm 14. The sides of the trough 8 are provided with a pair of arms 15 that extend forwardly and toward the central vertical plane of the machine. They are interconnected by a bar 18 to which a link 17 is pivotally connected. The link 17 is also pivotally connected to the arm 14. When, therefore, the lever 12 is drawn toward the operator who may be seated on the seat 21, the trough 8 will be lifted. The arm 12 is provided with the usual ratchet disc 22 and dog 24. The dog 24 may be operated by a slidable rod 25 and the pivoted handle 27 to secure the trough in desired positions with reference to the soil.

The forward end of the trough 8 is provided with a pair of scoops 28 preferably formed to have a concave upper surface. The scoops 28 have leading edges 30 that are inclined rearwardly and inwardly with respect to the machine to produce a progressive shearing of the soil toward the center line of the machine. The scoops slope with reference to the surface of the ground substantially with the same inclination that the trough 8 slopes with respect to the surface of the ground, and consequently there will be an upward and inward deflection in the movement of the soil and the vegetables over the forward edge portions of the scoops. Also, the soil and vegetables will be pushed to the rear edge portions of the scoops as the machine moves over the surface of the ground.

The trough 8 comprises side boards or plates 32, and a reticulated or latticed conveyor belt 34 forms the bottom of the trough 8. The conveyor belt 34 is provided with a plurality of rods 35 that extend transversely with respect to the machine and are bent and interconnected at their ends to form chain parts 37 located contiguous to the inside surfaces of the side plates 32. The chains 37 and the rods 35 that make up the conveyor belt 34 are driven by the toothed wheels 38 that are connected to the shaft 11. The conveyor belt 34 moves over the rods 40 and 41 that may be provided with toothed idlers. The dirt will pass between the rods and thus be separated from the vegetables and fall to the ground as the scoops 28 are elevated from the soil surface and the vegetables are conveyed from the scoops.

The conveyor belt 34 conveys the potatoes upwardly to a point above the conveyor belt 44 that is formed of the rods 45 which are interconnected at their ends to form the chain parts 47. The belt 44 passes over toothed wheels 48 and 50 connected to the ends of the shafts 51 and 52. The shafts 51 and 52 are rotatably supported in parts of the frame 1 of the machine. The upper side part of the belt 44 moves between a pair of plates 54 for confining the potatoes that are dropped on the belt 44 from the belt 34. Also suitable toothed idlers, such as the idler 55, for supporting the upper side part of the belt 44 may be disposed contiguous to the side chain parts 47. Also idlers, such as the idler 57, may be used for taking up the slack of the lower side part of the belt intermediate the gear wheels 48 and 50.

The potatoes on the belt 34 are caused to roll laterally and rub against each other to remove by the attrition the dirt and soil that may cling to the surfaces of the potatoes. The potatoes are carried over the upper end part of the belt 34 and allowed to fall downward upon the belt 44 and are then further conveyed upwardly by the belt 44. The inclination of the belt 44 is somewhat less than the inclination of the belt 34. The upper end of the belt 34 is raised above the lower end of the belt 44 to prevent the potatoes from rolling down to the scoops as they are jarred and manipulated to remove fine or small parts or particles of the soil or dust while on the belt 44.

To insure complete removal of the dirt, a suitable rectangular agitator 58 having teeth that mesh with the rods 45 are provided. The agitators 58 are rotatably supported on end parts of the shaft 56 that is connected to the frame of the machine. Due to the rectangular formation of the agitators 58, portions of the belt 44 that sequentially engage the agitators are raised and dropped by the movement of the agitators so as to jar the potatoes and jar the dirt therefrom. Since the upper end of the belt 34 is located above the lower end of the belt 44, the potatoes cannot descend to the scoops by the lift produced by the agitators and they will be ultimately conveyed past the agitators and over the upper end of the belt 44.

The belt 34 has a width to extend across the rear ends of the scoops that gather the vegetables from a plurality of rows of vegetation, while the belt 44 is preferably formed to have a much narrower width. It extends from a central part of the delivery end of the belt 34. The machine is provided with means for producing surface attrition of the vegetables against each other and with the rods 35 of the belt 34 to cause removal of the soil that may cling to the surface of the vegetable products. Deflector plates 59 are disposed contiguous to the upper side part of the belt 34 and are located in a direction inclined to the path of the normal movement of the harvested products on the belt 34 as the products are delivered from the scoops 28 to the belt. The plates 59 operate to disturb the vegetables and often to tumble them from the parts of the rods on which they may be lodged as they are delivered from the scoops, and cause them to move or roll inwardly toward the center part of the belt 34, and the dirt which, if it does not work through the belt, will be carried over the upper end of the belt and discharged from the underside part of the belt. Thus, the leading part of the machine insures complete separation of the soil from the vegetables.

The potatoes are discharged from the upper end of the belt 44 onto a conveyor belt 60 that conveys the potatoes laterally to deposit them at one side of the machine. They may be, if desired, directed into a trough and allowed to fall to the ground or elevated to a wagon drawn along by or beside the machine.

The belt 60 may be extended into an adjustable discharge trough 61. The discharge trough 61 may be adjustably disposed to elevate the potatoes to a wagon or to discharge the potatoes in a single row along the side of the machine. The sides of the trough may be provided with the holes 62 disposed in an arc of a circle and so as to align with an opening formed in each of the side plates 63 that extend along the side edge parts of the belt 60 to prevent rolling of the vegetables from the belt 60. The plates 63 are secured to parts of the frame 1 of the machine, and the trough 61 may be adjustably secured by the bolts or pins 64.

The belt 60 is comprised of rods 65 that are interconnected to form the chain parts 66. The belt moves over the toothed wheels 67 and 68 and also suitable idlers 70. The wheels 67 are connected to the ends of the shafts 71 and 72 which are rotatably supported in suitable bearings formed in the frame of the machine, and the wheels 68 are rotatably supported on the shaft 73 supported in brackets located on the end of the trough 61. The trough 61 is hingedly connected to the shaft 72 to enable adjustment of the trough 61 with respect to the machine to lower or elevate the end part of the belt 60. The idlers 70 are rotatably supported on shafts 74 that may be secured in parts of the frame of the machine.

The conveyor belts of the machine are driven by the engine 77 mounted on a suitable platform forming a part of the frame of the machine. The engine is provided with a suitable clutch controlled by the lever 78 conveniently disposed relative to the seat 21. When the clutch is operated, the engine 77 drives the sprocket wheel 80 which is connected to the shaft 52. The engine 77 is connected to the sprocket wheel 80 by the sprocket chain 81. The shaft 52 operates the toothed wheels 50 which actuate the belt 44 that also moves over the toothed wheels 48 and actuates the shaft 51. The shaft 51 is connected to the shaft 11 by a sprocket gear 82 including suitable sprocket chains and sprocket gear wheel. The toothed wheels 38 that are connected to the shaft 11 operate the conveyor belt 34.

The conveyor belt 60 is actuated by the shaft 52 to which the sprocket wheel 80 that is driven by the engine 77 is connected. A beveled gear wheel 84 is connected to the shaft 52 and a beveled gear wheel 85 is connected to the shaft 72. A shaft 87 is rotatably supported in suitable brackets connected to the frame of the machine and is provided with the bevel gear wheels 88 and 90 that mesh with the gear wheels 84 and 85 to cause rotation of the shaft 72 and movement of the belt 60 to convey the potatoes from the machine, either to deposit them in a row or deposit them in a wagon or other receptacle supported on or conveyed by the machine as it moves over the field.

I claim:

1. In a machine for harvesting vegetables, a concave, soil penetrating, and vegetable collecting scoop, a conveyor belt for elevating the vegetables from the scoop and having openings therethrough for separating the soil from the vegetables, and members extending diagonally with respect to the movement of the conveyor for producing lateral movement of the vegetables toward the central part of the belt.

2. In a machine for harvesting vegetables, a scoop means for gathering vegetables from a plurality of rows simultaneously, a conveyor belt for elevating the vegetables from the scoop means and having openings for separating the soil from the vegetables, means for laterally moving the vegetables from the path of movement of the vegetables as delivered to the conveyor from the scoop means to a central part of the conveyor, and a second conveyor belt for receiving the vegetables from the first named belt.

3. In a machine for harvesting vegetables, a scoop means for gathering vegetables from a plurality of rows simultaneously, a conveyor belt for elevating the vegetables from the scoop means and having openings for separating the soil from the vegetables, means for laterally moving the vegetables from the path of movement of the vegetables as delivered to the conveyor from the scoop means, to a central part of the conveyor, and a second belt for receiving the vegetables from the central part of the first named belt and at a point on the second belt located below the upper end of the first named belt.

4. In a machine for harvesting vegetables, a scoop means for gathering vegetables from a plurality of rows simultaneously, a conveyor belt for elevating the vegetables from the scoop means and having openings for separating the soil from the vegetables, means for moving the vegetables from the path of movement of the vegetables, as delivered to the conveyor to separate the vegetables from soil, a second belt for receiving the vegetables from the first named belt, and an agitating means for agitating sequential portions of the said second belt to remove soil from the vegetables.

5. In a machine for harvesting vegetables, a pair of concave, soil penetrating, and vegetable collecting scoops, a conveyor belt for elevating the vegetables from the scoops and having openings therethrough for separating soil from the vegetables, members extending diagonally with respect to the movement of the conveyor belt and located in the paths of movement of the vegetables from the scoops as conveyed by the belt to produce lateral movement of the vegetables toward the central part of the belt, a second belt for receiving the vegetables from the first named belt and further elevating the vegetables, and means located in proximity to the delivery point of the vegetables to the said second belt for alternately raising and dropping the portions of the said second belt to remove soil from the vegetables.

6. In a machine for harvesting vegetables, a soil penetrating and vegetable collecting means, a conveyor belt for elevating the vegetables from the soil means and having openings therethrough for separating the soil from the vegetables, members extending diagonally with respect to the movement of the conveyor belt and located in the path of movement of the vegetables from the scoops as conveyed by the belt, to produce lateral movement of the vegetables toward the central part of the belt, a second belt for receiving the vegetables from the first named belt and further elevating the vegetables, and a third belt for receiving the vegetables from the said second belt and conveying the vegetables toward one side of the machine, and means for adjusting an end part of the third belt for discharging the vegetables at desired elevations.

AARON E. McCOY.